United States Patent [19]

Weber et al.

[11] Patent Number: 4,614,634

[45] Date of Patent: Sep. 30, 1986

[54] PROCESS FOR THE PRODUCTION OF PLASTIC FILMS HAVING IMPROVED OPTICAL PROPERTIES

[75] Inventors: Hans-Leo Weber, Rommerskirchen; Uwe Claussen, Leverkusen; Hellmut Hannes, Beedenbostel, all of Fed. Rep. of Germany

[73] Assignee: Bayer Aktiengesellschaft, Leverkusen, Fed. Rep. of Germany

[21] Appl. No.: 683,075

[22] Filed: Dec. 18, 1984

[30] Foreign Application Priority Data

Dec. 31, 1983 [DE] Fed. Rep. of Germany ....... 3347684

[51] Int. Cl.$^4$ ............................................. B29C 71/00
[52] U.S. Cl. .................................... 264/341; 264/1.3; 264/2.6; 264/343
[58] Field of Search ................ 264/1.3, 341, 343, 346, 264/2.6, 232

[56] References Cited

U.S. PATENT DOCUMENTS

| | | | |
|---|---|---|---|
| 2,317,409 | 4/1943 | Seaton | 264/346 |
| 2,332,674 | 10/1943 | Smith | 264/346 |
| 2,659,105 | 11/1953 | Halbig et al. | 264/346 |
| 2,664,025 | 12/1953 | Herman | 264/341 |
| 2,897,546 | 8/1959 | Clapp et al. | 264/346 |
| 3,200,182 | 8/1965 | Hechelhammer et al. | 264/346 |
| 3,327,033 | 6/1967 | Koch et al. | 264/343 |
| 3,541,200 | 11/1970 | Niegisch | 264/343 |
| 3,546,332 | 12/1970 | Merriam et al. | 264/346 |
| 3,547,748 | 12/1970 | D'Onofrio et al. | 264/346 |
| 3,555,135 | 1/1971 | Paul | 264/346 |
| 3,970,362 | 7/1976 | Laliberte | 264/1.3 |
| 4,133,912 | 1/1979 | Stuart | 264/341 |
| 4,357,295 | 11/1982 | Haddad et al. | 264/341 |
| 4,361,527 | 11/1982 | Rarr | 264/346 |
| 4,376,751 | 3/1983 | Druhane | 264/341 |

FOREIGN PATENT DOCUMENTS

| | | | |
|---|---|---|---|
| 1044756 | 11/1958 | Fed. Rep. of Germany | 264/343 |
| 1183231 | 12/1964 | Fed. Rep. of Germany | 264/343 |
| 2658482 | 6/1978 | Fed. Rep. of Germany | 264/343 |
| 791135 | 2/1958 | United Kingdom | 264/341 |
| 1079585 | 8/1967 | United Kingdom | 264/343 |

*Primary Examiner*—James Lowe
*Attorney, Agent, or Firm*—Sprung Horn Kramer & Woods

[57] ABSTRACT

An optically virtually isotropic plastic film, in particular for use in liquid crystal displays, can be produced by a method in which first an optically uniaxial birefringent plastic film is produced by casting or extrusion, and then irreversible molecular reorientation is produced in layers of the film close to the surface by heating or by immersion in a solvent or swelling agent. This reoriented structure is retained after cooling or drying of the film, and results in the birefringence (anisotropy) initially present being eliminated or compensated.

6 Claims, No Drawings

PROCESS FOR THE PRODUCTION OF PLASTIC FILMS HAVING IMPROVED OPTICAL PROPERTIES

The invention relates to a process for the production of an optically virtually isotropic plastic film, and its use in liquid crystal displays.

In most industrial applications of plastic films, the optical anisotropy which is frequently present and which results in birefringence has no effect. Examples of such applications are tracing films in cartography, information carriers for signal displays, colour filters, membrane switches and reflecting films. On the other hand, isotropy is an important property when the plastic films are used in optical instruments or arrangements which employ polarised light. This is the case in, for example, the conventional liquid crystal displays (LCD). The windows or substrates used in such displays must not have any disturbing effect on the polarised light. It is known that birefringence in an optically uniaxial crystal results from the fact that light waves with planes of polarisation at right angles to each other generally have different rates of propagation in the crystal. The polarisation state of the light changes simultaneously with the birefringence. It is therefore clear that the use of birefringent plastic films as windows in displays gives rise to substantial difficulties when the display effect is in turn based on electric field-dependent birefringence or rotation of the plane of polarisation in the liquid crystal layer. The solution to the problem of birefringence is therefore the essential prerequisite with regard to the technical use of plastic films in liquid crystal displays. For this reason, glass has been used throughout in liquid crystal displays, as the only technically usable material. However, the use of glass is associated with a number of disadvantages. Because glass is difficult to work, only particular formats dependent on the machinery can be provided, and subdivision of these by an economical method involving scratching and breaking only permits the production of rectangular formats. Glass splinters produced in this procedure can have an adverse effect on the operation of the display and hence result in breakdowns.

Furthermore, the handling and storage costs for the large numbers and different formats produced is considerable. Moreover, the fragile nature of the glass requires sheet thicknesses of at least 1 mm, so that the weight of the glass sheets themselves is noticeable compared with the other components of the display, and has an adverse effect.

There has therefore been no lack of attempts to employ transparent plastics in liquid crystal displays (see, for example, U.S. Pat. No. 4,228,574, British Patent Specification No. 2,052,779, SID 81, page 86 and page 116, and SID 82, page 178 to 181). As a rule, however, plastics are not isotropic and particularly mechanically or chemically stable at the same time. Moreover, the technology of liquid crystal displays based on glass cannot be extrapolated directly to plastics. It is true that, for each process step in glass technology, it is possible to find a plastic which approximates, or even surpasses, the properties of glass. To date, however, no liquid crystal display based on plastics has been disclosed which is equivalent to the liquid crystal display based on glass, since there is no plastic which simultaneously possesses all the properties required.

It has also been disclosed that polycarbonate films can be used for this purpose (JP 55 017 135). Furthermore, German Auslegeschrift No. 1,232,336 discloses that the electrical and mechanical properties of polycarbonate films can be improved by treatment in a solvent bath or swelling agent bath. The change in these properties is attributable to a structural change in the films, which is caused by a shrinkage process. However, no attention is paid to the problem of optical birefringence.

It is therefore the object of the invention to provide plastic films in which the birefringence is eliminated or at least greatly reduced. In order that they can be used in liquid crystal displays, the films, in addition to possessing adequate mechanical properties, such as dimensional stability, permeability to steam, scratch-resistance and temperature-sensitivity, must be capable of being processed easily and continuously to all required formats, and must be chemically resistant to the effect of a large variety of auxiliary chemicals, such as dyestuffs, orienting layers, etc.

This object is achieved, according to the invention, by a method in which first an optically uniaxial birefringent plastic film is produced in a manner which is known per se, by casting or extrusion, and, in layers of the film close to the surface, irreversible structure-relaxation processes are initiated by radiant heat or by immersion in a solvent or swelling agent, which relaxation processes result in molecular reorientation in the layers close to the surface, the reoriented structure being retained after cooling or drying of the film, and resulting in the birefringence being eliminated or compensated. The thermal treatment or, alternatively, the immersion process apparently loosens the association of the molecules in the zones close to the surface to such an extent that molecular reorientation (relaxation) becomes possible, and the birefringence vanishes virtually completely. It is surprising that this reorientation remains irreversible; that is to say, it is, so to speak, frozen in on cooling or drying. In this context, it is important that the film be exposed for only a relatively short time to the radiant heat or the solvent or swelling agent. Hence, layers of the film close to the surface are heated temporarily by the radiant heat, whereas the volume is affected only slightly, if at all. This applies in particular to radiation sources the wavelength of which is in the region of an absorption band of the film material. The depth of penetration of the radiation can be controlled via the wavelength. In accordance with the definition, the "layer close to the surface" is understood here as meaning a region which corresponds to 10 to 30%, preferably 15 to 20%, of the total thickness of the film. This is in contrast with the heating process frequently used in industry, in which process the entire volume of the material is heated under steady-state conditions.

In a similar manner, the treatment of the film in a dipping bath is carried out for a time which is sufficiently short so that the solvent does not impregnate the entire film but can only diffuse into the outer layers close to the surface. Penetration of the solvent front into the film can be rendered visible by means of an interference microscope. Shrinkage of the film, as occurs as a result of the prolonged action of the solvent or swelling agent, was not observed in the experiments carried out here. After the drying procedure, a film having a completely transparent surface with high optical quality is obtained.

The birefringence initially present is reduced by the thermal treatment or, alternatively, by the treatment in a dipping bath to such an extent that virtually no change in the polarisation state occurs when these films are used in conjunction with LCD displays. A possible explanation of the reduction of the birefringence is as follows: the production process (casting) gives rise to oriented molecular structures in layers close to the surface, and these structures cause anisotropy and hence optical birefringence. On heating or partially dissolving these layers, the molecular association is loosened and the mobility of the molecules is increased to such an extent that the above-mentioned compensation in relaxation processes can take place, and the anisotropy substantially vanishes. In the subsequent drying procedure, the mobility is then once again "frozen in". As a result, the molecular reorientation is surprisingly retained in the layers close to the surface.

It is advantageous to start from cast plastic films the thickness of which is in the range from 5 $\mu$m to 0.8 mm. The subsequent treatment with the swelling agent or solvent is carried out in such a way that the films are exposed to the solvent or swelling agent in a bath for 1 s to 5 min, preferably 10 s to 2 min. The treatment is carried out at room temperature. Drying of the partially dissolved or partially swollen films is carried out in a stream of air at temperatures from 20° to 140° C.

Starting materials advantageously used for the films are polymers for which it is possible to state a solvent or swelling agent which, apart from the desired isotropy effect, does not have any undesired side effects, such as, for example, clouding, and gives a clear homogeneous surface. Suitable examples are polystyrene, polyvinyl chloride, polyacrylates and polyesters.

Suitable solvents or swelling agents for the required treatment are xylene, cyclohexanone, tetrahydrofuran, methyl ethyl ketone, toluene, benzyl alcohol, dimethylformamide, methylene chloride, acetone, ethyl ether, ethylene chloride, trichloroethane, chloroform, m-cresol, pyridine, dioxane, benzene, chlorobenzene, Tetralin, ethyl acetate, acetonitrile and carbon tetrachloride.

Polycarbonate films have proved particularly useful, these films advantageously being immersed in a tetrahydrofuran bath.

The plastic films produced in this manner, which are virtually free from birefringence, are suitable as components (windows or substrates) for liquid crystal displays in which the display is produced by means of polarised light.

EXAMPLE 1

(Treatment in Dipping Bath)

Bisphenol A polycarbonate having a mean molecular weight of 98,000 is dissolved in methylene chloride (0.5 g/ml) at 20° C., and this solution is poured onto a slowly rotating, heated and polished cylinder, via a knife-coating apparatus. A clear transparent film having a layer thickness of 200 $\mu$m is obtained. This film is analysed quantitatively between crossed polarisers in a polarisation microscope, using a compensator. Pronounced birefringence, corresponding to a path difference $\Delta G$ of 74 nm, is observed. The product is optically uniaxial. The film is then immersed for 10 seconds in tetrahydrofuran at a temperature of 20° C., and then dried in a stream of air at 110° C. for 3 min. Re-examination of the film with the polarisation microscope gives a path difference of only 14 nm, which is equivalent to greatly reduced birefringence. If a film which has not been immersed and still possesses birefringence is introduced into a beam path with crossed polarisation filters, substantial brightening is observed. This brightening is attributable to the fact that the birefringence results in a change in the polarisation state of the light. Since in many displays the display effect is based precisely on a brightening effect observed between crossed polarisers, the brightening caused by the birefringence of the film is troublesome and can even completely mask the display effect. In contrast, virtually no brightening is observed after the film has been immersed and dried. The film treated in this manner is virtually free from birefringence and is therefore suitable for incorporation in LCDs.

EXAMPLE 2

(Thermal Treatment)

In a further series of experiments, samples were taken, parallel with and at right angles to the casting direction, from a 100 $\mu$m thick polycarbonate film produced as in Example 1, and the samples were subjected to a thermal after-treatment. For this purpose, the samples were placed in a frame so that they were free from stress and were attached only at two opposite edges while remaining unattached at the other two edges. The frame could be fixed in a holder, the films otherwise being self-supporting; that is to say they were not supported at any point apart from the attached edges. A radiant quartz heater having an energy density of 20 kW/m$^2$ was mounted above this arrangement, at a distance of approx. 35 cm. By means of a relatively short exposure time in the region of 5 s to 60 s, it was possible to heat essentially only the layers close to the surface. When the lamp was switched off, the film samples rapidly cooled to room temperature. They were then examined under a polarisation microscope, as described in Example 1. The samples taken parallel with and at right angles to the casting direction gave the following residual bath differences, as a function of the heating time:

| Time, | Residual bath difference (nm) | |
| --- | --- | --- |
| sec. | parallel | at right angles |
| 5 | 61 | 8.5 |
| 10 | 69 | 10.6 |
| 15 | 51 | |
| 20 | 40 | 5.0 |
| 25 | 35 | |
| 30 | 6.5 | 8.7 |
| 35 | 9.5 | |
| 40 | 5.3 | 4.3 |
| 50 | 5.0 | |
| 60 | 4.0 | 2.0 |

It can be seen that the residual path difference in the samples taken in the longitudinal direction decreases to very small values for a heating period of $\geq$ 0.5 min. The polycarbonate films thermally treated in this manner are therefore virtually free from birefringence and, like the dipped films described in Example 1 are hence suitable for incorporation in LCDs.

We claim:

1. Process for the production of an optically virtually isotropic bisphenol A polycarbonte film, characterized in that an optically uniaxial birefringent bisphenol A polycarbonate film is produced in a manner which is known per se, by casting or extrusion, and, in a region close to the surface which corresponds to 10 to 30%, of the total thickness of the film, irreversible relaxation process are then initiated by dipping in a solvent or swelling agent, which results in a molecular reoriented structure being retained after drying of the film, and resulting in the birefringence being eliminated or compensated.

2. A process according to claim 1, wherein the region close to the surface of said film corresponds to 15 to 20% of the total thickness of the film.

3. Process according to claim 1, characterised in that films having a thickness of 5 μm to 800 μm, preferably 50 μm to 300 μm, are used.

4. Process according to claim 1, characterised in that the film is introduced into the dipping bath for a time which is sufficiently short that the solvent affects, in total, 10% to 30%, preferably 15% to 20%, of the film volume, measured from the surface.

5. Process according to claim 4, characterised in that the film is exposed to the dipping bath for 1 s to 5 min, preferably 10 s to 2 min.

6. Process according to claim 1, characterised in that tetrahydrofuran is used as the solvent.

* * * * *